United States Patent Office 3,301,800
Patented Jan. 31, 1967

3,301,800
ACID-TREATED CORNCOB CONSTRUCTION MATERIAL AND METHOD OF PRODUCING SAME
Turgut Demirel, Ames, Iowa, assignor to Iowa State University Research Foundation, Inc., Ames, Iowa, a corporation of Iowa
No Drawing. Filed July 13, 1964, Ser. No. 382,400
4 Claims. (Cl. 260—17.4)

This invention relates to a novel construction material and to a method of producing the same. More specifically, this invention utilizes heretofore discarded corncobs as a principal ingredient in a construction board. This results in a board which can be sanded, sawed, painted, and/or drilled.

It is well known that corncobs, although a waste product, have tremendous potential as an inexpensive source of raw material suitable for a variety of uses. Heretofore, however, research efforts have resulted in not more than a nominal usage of the vast annual corncob production. It is, therefore, a primary object of the present invention to provide a method for producing a new construction material which will significantly utilize this waste product.

This construction material can be produced in a wallboard form similar in shape to prior art building materials such as, for example, plywood and other fiberboards. In order to successfully compete with these other products, however, it is necessary that the corncob-containing building material possess structural advantages not found in the prior art products. In this connection, it is another object of the present invention to provide a panel member having improved properties of high strength, durability, and unique hardness.

Further, prior art building materials such as plywood have not proved to be entirely satisfactory in that they are highly combustible and also readily absorb large amounts of water, causing excessive expansion which often results in rupture. Accordingly, another object of the present invention is to provide a method of treatment and a material composition which make the instant building material both substantially fireproof and water-resistant. Other and further objects and advantages of the present invention will appear as the specification proceeds.

In one embodiment of the invention, a wallboard panel is produced by curing a pressed composition of approximately equal parts of acid-treated, crushed corncob particles and furfural-derived resin. An unusual fabrication advantage of this wallboard panel is that the same type of resin used in the board may also be used as a liquid glue whose setting is aided by contact with the board.

The corncobs are initially subjected to an acid bath treatment where they are "digested." Phosphoric acid is advantageously employed for this purpose. In particular, excellent results have been obtained by treating the corncobs for at least about two hours with phosphoric acid at temperatures of about 80–110° C. The acid solutions used are in the range of 20–30% phosphoric acid. The acid treatment makes the otherwise flammable corncobs substantially fireproof and greatly improves their ability to bond with the resin.

The corncobs, after having been digested in the acid, are drained and crushed to a fine texture. The cobs, being composed of fibers which are both short and hard, can be easily ground to form a mixture of various sized particles. By carefully proportioning the various sized particles, a board composition of high density and strength can be produced. This proportioning can be done in much the same fashion as is common in the grading of aggregate for concrete or stabilized soil mixes. Actual particle size will be dependent upon ultimate use; however, it is desirable that the fibers be no longer than ½" and be of sizes such that a major portion will pass through a No. 10 mesh screen. Small sizes are advantageous because they enable greater grain-to-grain contact in the corncob-resin composition, thereby enhancing the overall strength of the wallboard.

When the acid-treated corncobs have been reduced to the desired particle size, they are then mixed with a resin-forming liquid. Although the mechanism of the invention is imperfectly understood, it is believed that the phosphoric acid addition to the cobs causes polymerization, forming an advantageous resin. Furfuryl alcohol is suitable to form the resin base. An advantageous substitute resin-forming liquid has also been developed, which includes a mixture of approximately equal parts of furfuryl alcohol and spent sulfite liquor (a waste product of the paper industry), to which is added a trace of phosphoric acid serving as, in effect, a catalyst. In particular, a ratio of 1:1:0.05 provides highly effective bonding with the corncob particles, i.e., one part of alcohol, one part of liquor, and $\frac{1}{20}$ part (all by weight) of acid.

Another important factor in providing a structurally suitable building material is the relative ratio of the volumes of corncob material to resin. Substantially equal volumes of corncobs and resin produce a board having a greater modulus of rupture than is provided by conventional plywood panels of the same thickness. In particular, it has been found that corncob-resin mixtures with corncob particle compositions of from 45% to 55% result in wallboards having suitable strength, durability and hardness characteristics, with the specific range of 47% to 52% being particularly advantageous. For example, corncob panels produced within these ranges have a modulus of rupture of from 2650 p.s.i. to 2700 p.s.i., as compared to 2100 p.s.i. for Douglas fir plywood.

Another advantage of the corncob board of the present invention is its water resistance. In this connection, it is well known that conventional plywood will, upon being soaked in water, rupture as a result of excessive expansion. The corncob-resin board of the present invention, however, upon soaking, absorbs only about 1% of its weight in water and expands only about 1.7% of its size. Similarly, water-soaked corncob board has a modulus of rupture of about 1500 p.s.i. as compared to "0" for water-soaked plywood.

After the mixing step, the corncob and resin mixtures are formed into the desired shape. This generally is a flat panel shape, and could be done by compressing the material between rollers or in a press.

By curing the formed building material in an oven for an extended period of time, high strength properties are developed in the board. In particular, an oven curing at 80–120° C. for about at least 10 hours has been found to be sufficient to polymerize the furfuryl alcohol. In this connection, it should be recognized that bonding between the resin and corncob particles is enhanced by reason of the phosphoric acid pre-treatment of the cobs. Further, the fact that corncobs are a source of furfural enables the furfural-derived resins to form an exceptionally strong bond to the surface of the acid-treated corncob particles.

Reference may be had to the following illustrative examples for a more complete understanding of the invention:

*Example I*

A batch of corncobs was soaked in a 25% phosphoric acid solution for 2 hours at 80° C. Upon completion of this step, the corncobs were drained and reduced in size by crushing. The crushed corncobs were then passed through a No. 10 mesh wire screen. This screened product was mixed with an equal volume of furfuryl alcohol to which a trace of 25% phosphoric acid had been added and then pressed between two flat panels to form a wallboard panel. The board was then placed in an oven set at 110° C. and cured for a 24-hour period. The board manifested superior properties for sawing, drilling, etc.

*Example II*

A batch of corncobs was contacted with a 25% phosphoric acid solution for 1¾ hours at a temperature of 100° C. The digested product was then crushed to a fine texture and the particles screened through a No. 10 mesh wire screen. A liquid mixture containing equal parts of furfuryl alcohol and spent sulfite liquor to which a trace of phosphoric acid was added was mixed with an equal volume of crushed corncob particles. After thorough mixing to insure a uniform consistency throughout, the mixture was pressed between a pair of flat forms and cured in an oven at 110° C. for a 24-hour period to produce a commercially acceptable board.

*Example III*

A batch of corncobs was contacted with a 25% phosphoric acid solution for 2 hours at a temperature of 110° C. The digested product was then crushed to a fine texture and the particles screened through a No. 10 mesh wire screen. A liquid mixture consisting of furfuryl alcohol, spent sulfite liquor and phosphoric acid in a volumetric ratio of 1:1:0.05 was mixed with the crushed corncob particles. The volumetric ratio of the corncob particles to the liquid mixture was 47:53. After thorough mixing, the mixture was pressed between a pair of flat panel-forming members and cured in an oven at 110° C. for a 12-hour period. The resulting wallboard product was found to have desirable strength properties, as is evidenced by the testing described below.

After curing, the corncob board was tested to determine its modulus of rupture, and it was observed that when in its unsoaked condition the board had a modulus of rupture of 2680 p.s.i. The board was then soaked in water, and it was observed that it had a water absorption of 1.3% and an expansion after soaking of 1.7%. The modulus of rupture after soaking was 1500 p.s.i.

*Example IV*

The process was carried out as in Example III except that the volumetric ratio of corncob particles to liquid mixture was 52% to 48%. The resulting product was found to have physical properties substantially identical to those of the product described in Example III.

While in the foregoing specification, for purposes of illustrating specific embodiments of this invention, I have set forth many details as to specific compositions and operating conditions, it will be apparent to those skilled in the art that many of the details can be varied without departing from the spirit of the invention.

I claim:

1. In a process for making a construction material, the steps of contacting a batch of corncobs with a phosphoric acid solution of 20-30% concentration at 80-110° C. for digesting said corncobs, withdrawing said phosphoric solution from the digested corncob product, reducing the particle size of the corncob product to a fine texture, mixing said fine-textured product with a substantially equal volume of resin-forming liquid comprising furfuryl alcohol, sulfite liquor, and phosphoric acid, the amounts of furfuryl alcohol and sulfite liquor being approximately equal, forming the mixture into a predetermined shape, and curing said formed mixture at a temperature between 80° C. and 120° C. for promoting polymerization thereof.

2. The process of claim 1 wherein the volumetric ratio of corncob product to resin-forming liquid ranges from 47:53 to 52:48.

3. The process of claim 1 wherein the ratio of furfuryl alcohol to sulfite liquor to phosphoric acid in said resin-forming liquid is about 1:1:0.05.

4. A non-combustible panel member, comprising approximately equal amounts of phosphoric acid-treated corncob particles bonded in a cured resin derived from a liquid mixture of furfuryl alcohol, spent sulfite liquor and phosphoric acid, the ratio of furfuryl alcohol to spent sulfite liquor to phosphoric acid being approximately 1:1:0.05.

References Cited by the Examiner

UNITED STATES PATENTS

| | | | |
|---|---|---|---|
| 2,153,316 | 4/1939 | Sherrard et al. | 260—9 |
| 2,437,955 | 3/1948 | Hersh | 260—17.5 |
| 2,645,587 | 7/1953 | Williamson | 260—9 |
| 2,671,061 | 3/1954 | Sweeney et al. | 260—17.5 |

WILLIAM H. SHORT, *Primary Examiner.*

LEON J. BERCOVITZ, *Examiner.*

E. M. WOODBERRY, *Assistant Examiner.*